United States Patent
Pfefeer

[15] 3,663,947
[45] May 16, 1972

[54] VOLTAGE REGULATOR ARRANGEMENT FOR GENERATORS WITH PERMANENT MAGNETIC EXCITATION

[72] Inventor: Peter Pfefeer, Lauffen, Germany
[73] Assignee: Robert Bosch GmbH, Stuttgart, Germany
[22] Filed: June 25, 1970
[21] Appl. No.: 49,761

[30] Foreign Application Priority Data
July 4, 1969 Germany..................P 19 33 948.1

[52] U.S. Cl.................................322/26, 322/28, 322/91, 322/93, 323/21
[51] Int. Cl..........................................H02p 9/30
[58] Field of Search..................322/23, 26, 28, 36, 89, 90, 322/91, 93; 323/21

[56] References Cited

UNITED STATES PATENTS

| | | | |
|---|---|---|---|
| 3,059,169 | 10/1962 | Raver et al. | 322/95 |
| 3,476,993 | 11/1969 | Aldrich et al. | 317/235 AB |
| 3,456,182 | 7/1969 | Cummins et al. | 322/28 |
| 3,530,366 | 9/1970 | Schwarm | 322/28 |
| 3,475,677 | 10/1969 | Swinehart et al. | 323/21 |
| 3,524,123 | 8/1970 | Williams et al. | 322/91 X |
| 3,260,917 | 7/1966 | Shimwell et al. | 322/91 UX |

Primary Examiner—Lewis H. Myers
Assistant Examiner—H. Huberfeld
Attorney—Michael S. Striker

[57] ABSTRACT

A voltage regulating arrangement in which an alternating current generator with means for permanent magnetic excitation, has two output windings magnetically intercoupled. The junction between the two windings is connected to ground potential, whereas the remaining terminals of the output winding are connected to two rectifying circuits. A triac is connected in parallel with one of the windings, and one of the rectifying circuits provides a negative control voltage which is applied to the triac through a control circuit containing complementary transistors. The rectifying circuits provide a DC output voltage, and the triac is switched to the conducting state through the negative control voltage, whenever the rectified DC output voltage exceeds a predetermined level.

13 Claims, 2 Drawing Figures

Patented May 16, 1972  3,663,947

INVENTOR
Peter PFEFFER
BY his ATTORNEY 3,663,947

1

VOLTAGE REGULATOR ARRANGEMENT FOR GENERATORS WITH PERMANENT MAGNETIC EXCITATION

BACKGROUND OF THE INVENTION

The present invention relates to a voltage regulator for an alternating current generator with permanent magnetic means for excitation. The alternating current output of this generator is applied to a first DC rectifying arrangement for feeding a DC network. A semi-conductor switch connected in parallel with the output from the generator operates in conjunction with a control element which causes the semi-conducting switch to be conducting during operation, when the voltage across the DC network exceeds a predetermined threshold value.

Generators with permanent magnetic excitation means are mainly used for apparatus with low power requirements as, for example, tree-cutting saws, motor bicycles, small motorcycles, snow scooters, and small motor vehicles. These generators are particularly very simple in design, but they have an output voltage which is extremely dependent upon the load and the speed of operation. Thus, the output voltage for a 12-volt generator may exceed, for example, 200 volts. For this reason, a voltage regulator is necessary to regulate the output voltage from the generator. This voltage regulator is intended to be simple in design so that it may be economically fabricated. At the same time, such voltage regulator is intended to inhibit the appearance of dangerous voltages, and to protect excessive charging of a battery which may be connected thereto.

A simple solution to the preceding problem resides, in accordance with the present invention, in a voltage regulator using a triac for the semi-conductor switch. A second DC rectifier arrangement is provided for the purpose of supplying a negative auxiliary voltage during operation of the generator. This negative auxiliary voltage is to be applied to the control electrode of the triac, through a control device. If this voltage across the D.C. network exceeds a predetermined value, the bi-directional thyristor or triac is switched on and short circuits thereby the generator. Since only a voltage of approximately 1.5 volts is hereby applied to the triac, a power loss results so that for a small generator, 20 or 30 watts are applied. As a result, the voltage is without dangerous values. The DC network has no energy applied to it during the interval that the generator is short circuited. The negative auxiliary voltage is not derived from the DC network. Instead, this negative auxiliary voltage is directly derived from the generator. This solution is surprisingly simple, since when the triac is switched on, this negative auxiliary voltage becomes substantially zero. As a result, no further control current is applied to the triac when the latter is switched on. Since this triac or bi-directional thyristor remains conducting without this until the next passage to zero by the applied voltage, no further negative auxiliary voltage is necessary during this time interval. After passage through zero, the bi-directional thyristor becomes turned off, and a negative auxiliary voltage can again prevail. If the voltage across the DC network is still too high, this negative auxiliary voltage is again applied to the control electrode of the bi-directional thyristor through the control element, so that the thyristor becomes again conducting. The negative auxiliary voltage becomes thereby briefly generated and can switch on the bidirectional thyristor for as long as desired. Thus, the regulator can also operate when the DC network is not connected to the battery. This situation would not be possible if the negative auxiliary voltage were derived from the DC network.

In a further embodiment of the present invention, the voltage regulator is designed so that the alternating current generator has two magnetically coupled output windings. The bi-directional thyristor is connected in parallel with one of these two windings. Through the magnetic coupling, however, a short circuit of one of the output winding results in an effective short circuit of the other output winding. This situation is made possible in a simple manner through the bi-directional thyristor.

SUMMARY OF THE INVENTION

A voltage regulating arrangement in which an alternating current generator is provided with two output windings having a center tap connected to ground and negative potential. The end terminals of the two windings are connected to two rectifying circuits which provide a rectified DC output voltage. A triac is connected in parallel with one of the windings of the generator and is controlled from a negative voltage generated by one of the two rectifying circuits. This negative voltage is applied to the triac through a control circuit including complementary transistors, when the DC output voltage exceeds a predetermined value, whereby the triac conducts upon application of the negative control voltage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
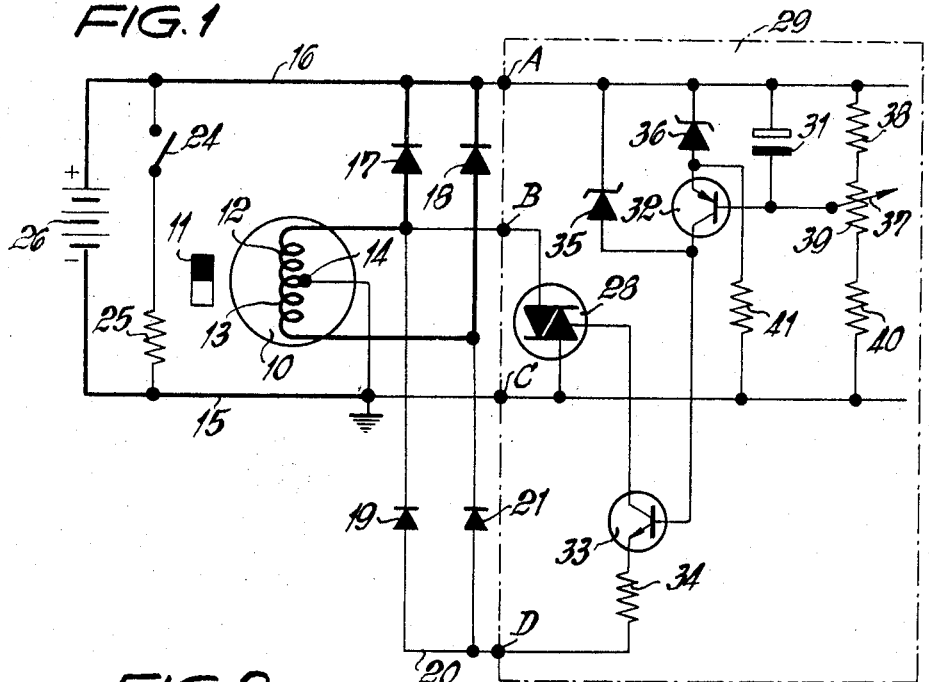
FIG. 1 is an electrical circuit diagram of the voltage regulator for an alternating current generator with permanent magnetic excitation means, in accordance with the present invention.

Referring to the drawing and in particular to FIG. 1, an alternating current generator 10 shown in symbolic form, is excited through permanent magnetic means 11. The generator 10 has two output windings 12 and 13 connected in series. The junction 14 of the two windings is connected to ground potential as well as the negative voltage supply line 15 of a DC network which has a positive supply line 16. The terminal of the winding 12 leads to the positive voltage supply line 16, through a power diode 17, whereas the terminal of the winding 13 leads to this voltage supply line 16 through a power diode 18. The two power diodes 17 and 18, when taken together, form a first rectifier arrangement. The terminal of the winding 12, furthermore, leads to a circuit line connection 20 through a diode 19 of smaller power capacity. Connected to this same circuit line 20, is also the terminal of winding 13, through a diode 21 also of lower power capacity. The diodes 19 and 21 form, together, the second rectifying arrangement which provides, during operation, a negative auxiliary voltage on the line 20.

As may be seen from the drawing, the diodes 17 and 18 are connected for opposite polarity in relation to the diodes 19 and 21. Thus, the cathodes of the diodes 17 and 18 are connected to the positive voltage supply line 16, whereas the the anodes of the diodes 19 and 21 are connected with the circuit line 20. As a result, the line 15 is more negative than the line 16 in operation. The line 20 is also more negative than the line 15. The output windings 12 and 13 are magnetically and closely intercoupled through the ferromagnetic core of the generator 10. As a result of this action, a short circuit of the winding 12 functions as a short circuit of the winding 13.

One or more loads 25 can be connected to the DC network 15,16 through a switch 24. Thus, such loads may be in the form of search lights, ignition systems or the like. A battery 26 is, furthermore, connected between the lines 15 and 16.

Connected in parallel with the output winding 12, is a bi-directional thyristor 28 in form of a conventional triac. Such triac have the property that when a control voltage is applied to their control electrodes, they conduct in both directions. A positive or a negative auxiliary voltage may be applied for this control voltage, but a negative voltage is essentially more advantageous. This results from the condition that the negative control current needs to be only 10 percent of the magnitude required when a positive voltage is applied. As may be seen from FIG. 1, the winding 12 is short circuited in both directions when the triac 28 conducts. Through the magnetic coupling between the windings 12 and 13, the winding 13 also becomes essentially short circuited in this case. In this manner, the output voltage from the generator 10 becomes reduced to 1.5 volts corresponding to the residual voltage drop across the triac 28.

The triac 28 is part of a voltage regulator 29 which has two transistors or control elements. One of these transistors 32 is of the PNP type, and the second transistor 33 is of the NPN type. The collector of the transistor 33 is connected to the control electrode of the triac 28, whereas the emitter of the transistor 33 leads to the circuit line 20, through a resistor 34. As a result, a negative auxiliary voltage is applied to the circuit line 20 during operation. The base of transistor 33 is directly connected to the collector of the transistor 32. The anode of a zener diode 35 is also connected to the collector of the transistor 32. The cathode of this zener diode, on the other hand, is connected to the positive voltage supply line 16. The zener diode is used in this circuit as a voltage break-down element.

The emitter of the transistor 32 is connected, through a resistor 41, to ground potential, as well as to the anode of a zener diode 36. The cathode of the element 36 is connected to the positive voltage supply line 16. The element 36 serves as a voltage reference element. The base of the transistor 32 is connected to one electrode of a capacitor 31 of, for example, 1.5 $\mu F$. The base of this transistor 32 is also connected to the movable contact 37 of a voltage divider made of three resistors 38,39, and 40. This voltage divider is connected between the positive voltage supply line 16 and the negative line 15. The other electrode of the capacitor 36 is connected to the positive voltage supply line 16. The terminal for interconnecting the voltage regulator 29 to the generator 10, are designated with the symbols, A,B,C and D.

In operation of the arrangement of FIG. 1, the output voltage of the generator 10 does not first reach the operating voltage when starting up, so that the zener diode 36 is turned off and no base current is available at the transistor 32. As a result, the transistor 33 receives no base current and is, accordingly, also turned off. The control electrode of the triac 28 has, thereby, no current applied to it. The triac 28 is, therefore, also non-conducting.

When with increased rotational speed, or with smaller load, the voltage across the DC network 15,16 rises above a predetermined value, the zener diode 36 commences to conduct, and the transistor 32 attains thereby base current. In this manner, the transistor 32 also becomes conducting and applies base current to the transistor 33. The transistor 33 also becomes thereby conducting, and current flows from the negative voltage line to the control electrode of the triac 28 for the purpose of rendering the latter conducting. With the triac 28 in the conducting state, the output winding 12 of the generator 10 is short circuited and as a result, the output winding 13 is also short circuited through the magnetic coupling. The voltage from the generator 10 drops thereby to the 1.5 volts described above, so that no energy can be further applied to the DC network 15,16 through the diodes 17 and 18. With this condition, therefore, the voltage across the DC network drops.

During this short circuiting procedure, the triac 28 becomes again briefly conducting whenever the voltage from the generator 10 passes through zero. This results from the condition that due to the short circuiting of the generator 10, the negative auxiliary voltage at the line 20 is also omitted. When the triac 28 becomes again briefly conducting when the voltage passes through zero, this negative auxiliary voltage also reappears. When the voltage across the DC network 15,16 is then still too high, current can flow from the line 20 through the second transistor 33, and to the control electrode of the triac 28 so that the latter is switched on anew.

As soon as the voltage across the DC network 15,16 is again sufficiently low, the zener diode 36 becomes again non-conducting, and the triac 28 acquires no control current anymore. Accordingly, when the voltage across the generator 10 passes then through zero, the triac 28 does not become again conducting. The circuit operation described above, is repeated continuously during operation. Thus, the triac 28 becomes alternatingly switched on and switched off.

If, in operation, a very severe increase in voltage is suddenly realized, when the battery 26 is, for example, disconnected, then the voltage rise switches the triac 28 only in a delayed manner through the capacitor 31 at the input of the regulator 29. During this delay time interval, the voltage across the DC network 15,16 can assume dangerous proportions as, for example, 200 volts. In order to avoid this possibility, the zener diode 35 is provided, which becomes conducting in this case as soon as the voltage across the DC network 15,16 exceeds a predetermined value. Such threshold value for the voltage across the DC network 15,16 may, for example, be 50 percent of the nominal voltage.

Base current is then applied in an undelayed manner to the second transistor 33, through the zener diode 35. As a result, the second transistor 33 becomes immediately conducting and switches on the triac 28. The latter then short circuits the output of the generator 10, so that the voltage becomes limited even with very rapid rise to dangerous magnitudes.

Figure 2:
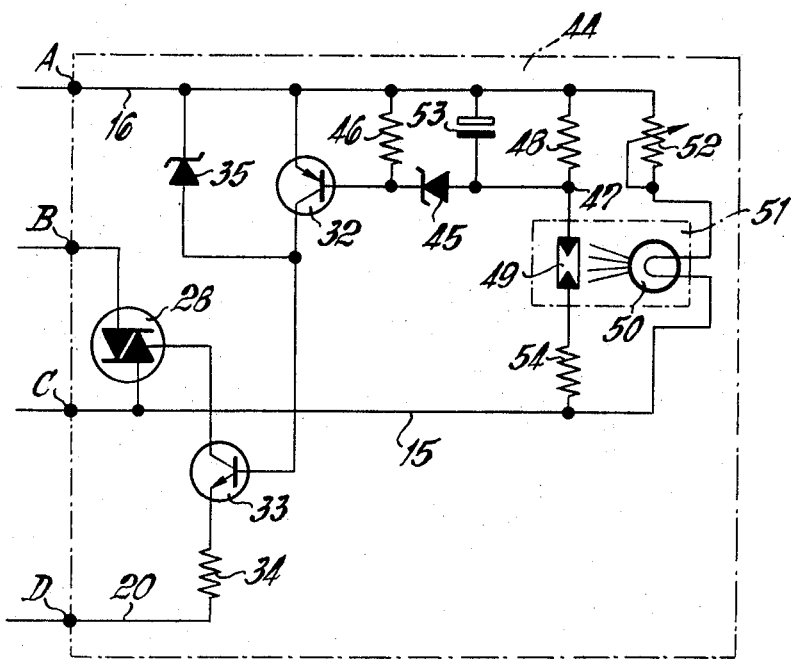
FIG. 2 is a circuit diagram of another embodiment of the voltage regulator of FIG. 1, based on optoelectronic means.

FIG. 2 shows a variation of the circuit of FIG. 1. The circuit of FIG. 2 is particularly well adapted to intermittent or continuous operation without being connected to the battery 26. The voltage regulator 44 used in FIG. 2, is thereby applied in place of the voltage regulator 29 in FIG. 1. The interconnecting terminals A,B,C,D are thereby used in FIG. 2 the same as in FIG. 1. Elements in FIG. 2 which are identical with those used in FIG. 1, are designated by the same reference numerals.

The first transistor 32 has its emitter directly connected to the positive voltage supply line 16, in FIG. 2. The cathode of the zener diode 35 is also directly connected to this positive voltage supply line 16. The base of the transistor 32 is directly connected to the cathode of a zener diode 45 serving as a voltage reference element. The base of the transistor 32, furthermore, is connected to the positive voltage supply line 16, through a resistor 46. The anode of the zener diode 45 is connected to a tap 47 of a voltage divider consisting of three resistors 48,49 and 54. This voltage divider, in this form, is connected between the voltage supply line 15 and 16.

The resistor 49 of the voltage divider composed of resistors 48,49 and 54 is in the form of a photoresistor which has reduced resistance when illuminated, in the conventional manner. This resistor 49 is arranged in conjunction with an incandescent lamp 50 within a dark enclosure 51. The arrangement serves as an optoelectronic unit with the incandescent lamp 50 being, for example, 6 volts and 0.6 watt. The enclosure 51 is also, as the remaining elements of the regulator 44, arranged directly upon a printed circuit board. The incandescent lamp 50 can, for example, be directly connected with the photoresistor 49, through a light-conducting glass rod which is either welded on or cemented on. In this manner, the light power is used with optimum efficiency. The spacing of the lamp from the photoresistor 49 is precisely fixed. A capacitor 53 is connected in parallel to the resistor 48.

The incandescent lamp 50 is directly connected to the negative voltage supply line 15 at one terminal. The other terminal of the lamp 50 leads to the positive voltage supply line 16, through an adjusting resistor 52. This resistor 52 serves to set the desired voltage, so that the current through the incandescent lamp 50 is at the nominal magnitude. The setting procedure is such that when the incandescent lamp 50 has a nominal voltage of 12 volts, for example, the resistor 52 is adjusted so that the filament of the lamp 50 appears dark red. In practice, it has been found advantageous to set the heating of the filament, so that it can be recognized only within a darkened space. In that case, particularly high resistance to vibration is realized, as are long operating life as well as optimum time constant for the regulating voltage.

In operation of the arrangement of FIG. 2, the output voltage of the generator 11 is first applied below the desired level. As a result, the lamp 50 provides no visible light, and the photoresistor 49 has a high ohmic value. The zener diode 45 receives only a substantially small voltage and is, thereby, non-conducting. Accordingly, the transistor 32 is also cut off, so that the transistor 33 acquires no base current and is thereby also cut off. With the triac 28 receiving no control current, the latter is also in the non-conducting state.

If, now, the voltage across the DC network 15,16 exceeds a predetermined level, the incandescent lamp 50 emits higher intensity illumination, so that the resistor 49 receives more light energy. As a result, the resistance value of the element 49 drops. At the same time, the voltage from the voltage divider 48,49,54 increases, so that the Zener diode 45 conducts. The transistor 32 receives thereby the base current and becomes conducting. Base current is, thereby, also applied to the second transistor 33, so that the latter also commences to conduct and provides control current from the negative line 20 to the control electrode of the triac 28. The triac can, thereby, conduct and short circuit the output of the generator 10 in the manner described relative to the arrangement of FIG. 1.

The voltage across the DC network 15,16 thereby drops again and the lamp 50 becomes again dark. At the same time, the zener diode 45, the transistors 32 and 33, and the triac 28 become again non-conducting so that the voltage across the DC network can again rise. This circuit procedure, in operation, is repeated continuously, whereby the voltage across the D.C. network is precisely set to the desired value.

In the voltage regulator of FIG. 2, the zener diode 35 also serves to switch the transistor 33 in an undelayed manner when the voltage across the DC network 15,16 rises suddenly. The lamp 50 has a predetermined thermal inertia or thermal delay which does not permit immediate switching of the triac 28 with sudden increase in voltage. When such sudden voltage increase does occur, the zener diode 35 becomes immediately conducting, and this leads to providing base current to the second transistor 33. As a result, the latter also becomes immediately conducting and control current is applied to the triac 28 which, thereby, is also immediately switched on. As a result, dangerous excess voltage which may appear in the manner described relative to FIG. 1, are avoided in a safe way.

As shown in FIG. 1, the first rectifier arrangement 17,18 as well as the second rectifier arrangement 19,21 are connected together with the two output windings 12,13 of the generator 10. With the circuit shown, it is possible that the two windings 12,13 feed the DC network 15,16, as well as the required negative auxiliary voltage on the line 20. A particularly simple design is made here possible in producing this negative auxiliary voltage on the line 20, since only two diodes 19,21 of relatively low power capacity are required. Thus, these two diodes 19 and 21 need only have a capacity of 200 mA. A particularly essential advantage of the circuit arrangement of the present invention resides in this aspect.

In the embodiment of FIG. 2, it is also possible, of course, to replace the incandescent lamp and the photoresistor with another optoelectronic arrangement. The latter can consist of, for example, so-called cold light sources based on semi-conductor design with corresponding sensors. The arrangement of FIG. 2, however, has the advantage that it can be economically produced with elements which are conventionally available. With the design of the present invention, the incandescent lamp 50 has also a very long operating life because it is operated when the filament is hardly visible while glowing red, and this causes the voltage regulator of FIG. 2 to be particularly reliable in operation.

It will be understood that each of the elements described above, or two or more together, may also find a useful application in other types of constructions differing from the types described above.

While the invention has been illustrated and described as embodied in voltage regulators, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the stand-point of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. A voltage regulating arrangement comprising, in combination, an alternating current generator; first rectifying means connected to the output terminals of said generator and providing a DC voltage output; bi-directional thyristor means connectable in parallel with the alternating output of said generator; second rectifying means connected to said output terminals of said generator and providing a negative voltage; control means for applying said negative voltage to the control electrode of said bi-directional thyristor for switching said thyristor to the conducting state when said DC voltage output exceeds a predetermined value; two complementary transistors in said control means; voltage reference means connected to a first one of said transistors for providing a control signal for the second one of said transistors dependent upon the magnitude of said DC voltage output, the emitter-collector path of said second transistor being connected between the output of said second rectifying means and the control electrode of said thyristor; and means with voltage breakdown characteristics connected in parallel with the emitter-collector path of said first transistor for providing an undelayed switching signal for said second transistor upon substantially rapid rise of said DC voltage output.

2. The voltage regulating arrangement as defined in claim 1 wherein said generator includes two magnetically coupled output windings, said thyristor means being connected in parallel with one of said two windings.

3. The voltage regulating arrangement as defined in claim 1 wherein said bi-directional thyristor comprises a triac.

4. The voltage regulating arrangement as defined in claim 1 including two output windings in said generator, said output windings and said first rectifying means comprising a center tap rectifier.

5. The voltage regulating arrangement as defined in claim 4 wherein said second rectifying means and said output windings comprise a further center-tapped rectifier, one of said rectifying means rectifying the positive half-wave of the alternating voltage from one of said output windings and the other rectifying means rectifying the negative halfwave of said alternating voltage from said one output winding.

6. The voltage regulating arrangement as defined in claim 1 wherein said voltage reference means comprises a zener diode.

7. The voltage regulating arrangement as defined in claim 1 wherein said means with voltage breakdown characteristics comprises a zener diode.

8. The voltage regulating arrangement as defined in claim 1 including voltage dividing means in said control means and connected to said DC voltage output for measuring the magnitude of said Dc voltage output; photoresistor means in said voltage divider means; optoelectronic means connected to said DC voltage output and illuminating said photoresistor means with light intensity dependent upon the magnitude of said DC voltage output.

9. The voltage regulating arrangement as defined in claim 8 including incandescent lamp means in said optoelectronic means and in proximity of said photoresistor means.

10. The voltage regulating arrangement as defined in claim 9 wherein said incandescent lamp means has a red glowing filament when in the operative state, i. e. at its nominal voltage.

11. The voltage regulating arrangement as defined in claim 2 wherein the junction of said two output windings of said generator provide the negative terminal of said DC voltage output and the positive terminal of an auxiliary voltage source, said thyristor means being connected between said junction and the output terminal of one of said windings.

12. The voltage regulating arrangement as defined in claim 1 including permanent magnetic excitation means for exciting said generator.

13. The voltage regulating arrangement as defined in claim 1 including battery means connected across said DC voltage output.

* * * * *